(12) United States Patent
Blanch et al.

(10) Patent No.: US 11,186,105 B2
(45) Date of Patent: Nov. 30, 2021

(54) DETERMINE A CHANGE OF A PRINT MEDIUM

(71) Applicant: HEWLETT-PACKARD DEVELOPMENT COMPANY, L.P., Spring, TX (US)

(72) Inventors: Marta Blanch, Sant Cugat del Valles (ES); Diana Canto Estany, Sant Cugat del Valles (ES); Eduardo Amela Conesa, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/761,397

(22) PCT Filed: Nov. 13, 2017

(86) PCT No.: PCT/US2017/061333
§ 371 (c)(1),
(2) Date: May 4, 2020

(87) PCT Pub. No.: WO2019/094049
PCT Pub. Date: May 16, 2019

(65) Prior Publication Data
US 2020/0346474 A1  Nov. 5, 2020

(51) Int. Cl.
*B41J 11/00* (2006.01)
*B41J 25/308* (2006.01)

(52) U.S. Cl.
CPC ........... *B41J 25/308* (2013.01); *B41J 11/002* (2013.01); *B41J 11/0035* (2013.01)

(58) Field of Classification Search
CPC ...... B41J 11/002; B41J 11/0035; B41J 25/308
See application file for complete search history.

(56) References Cited

U.S. PATENT DOCUMENTS

| | | |
|---|---|---|
| 6,388,452 B1 | 5/2002 | Picciotto |
| 7,290,949 B1 | 11/2007 | Phillips |
| 8,126,362 B2 | 2/2012 | Jones et al. |
| 8,251,504 B2 | 8/2012 | Viturro et al. |
| 8,760,792 B1 | 6/2014 | Tam |
| 2002/0071701 A1 | 6/2002 | Sullivan |
| 2008/0083726 A1 | 4/2008 | Spence |
| 2010/0067948 A1 | 3/2010 | Jones |
| 2012/0327153 A1 | 12/2012 | Bouverie et al. |
| 2013/0286126 A1 | 10/2013 | Hopener |

FOREIGN PATENT DOCUMENTS

| | | |
|---|---|---|
| CN | 1259433 A | 7/2000 |
| CN | 101121343 A | 2/2008 |
| CN | 103507415 A | 1/2014 |
| CN | 103753954 A | 4/2014 |
| CN | 107116907 A | 9/2017 |
| CN | 107264083 A | 10/2017 |
| JP | 5951356 A | 7/2016 |

OTHER PUBLICATIONS

Podhajny, R. M., How Do You Measure Ink Film Thickness? Count the Ways, Feb. 1, 2002.

*Primary Examiner* — Lamson D Nguyen
(74) *Attorney, Agent, or Firm* — HP Inc. Patent Department

(57) ABSTRACT

An example method to determine the change of a print medium due to heat dilatation or contraction is described. In that example the thickness before and after heating is determined and an offset value may be calculated to calibrate a print head to print medium distance.

20 Claims, 8 Drawing Sheets

DETERMINE A CHANGE OF A PRINT MEDIUM

BACKGROUND

In 2D and 3D printing technology, print material may be ejected through nozzles mounted on a print head onto a print medium. In some examples printing processes include heating the print medium, for example to dry, cure or bind the print material on the print medium. A print medium may be flexible, rigid or powdery and may change in form or size when heated. Print material may be a printing fluid, such as ink, toner, a liquid composition, a powder based material or grained material. Print material may also comprise binders, e.g. latex.

DETAILED DESCRIPTION

Figure 1:
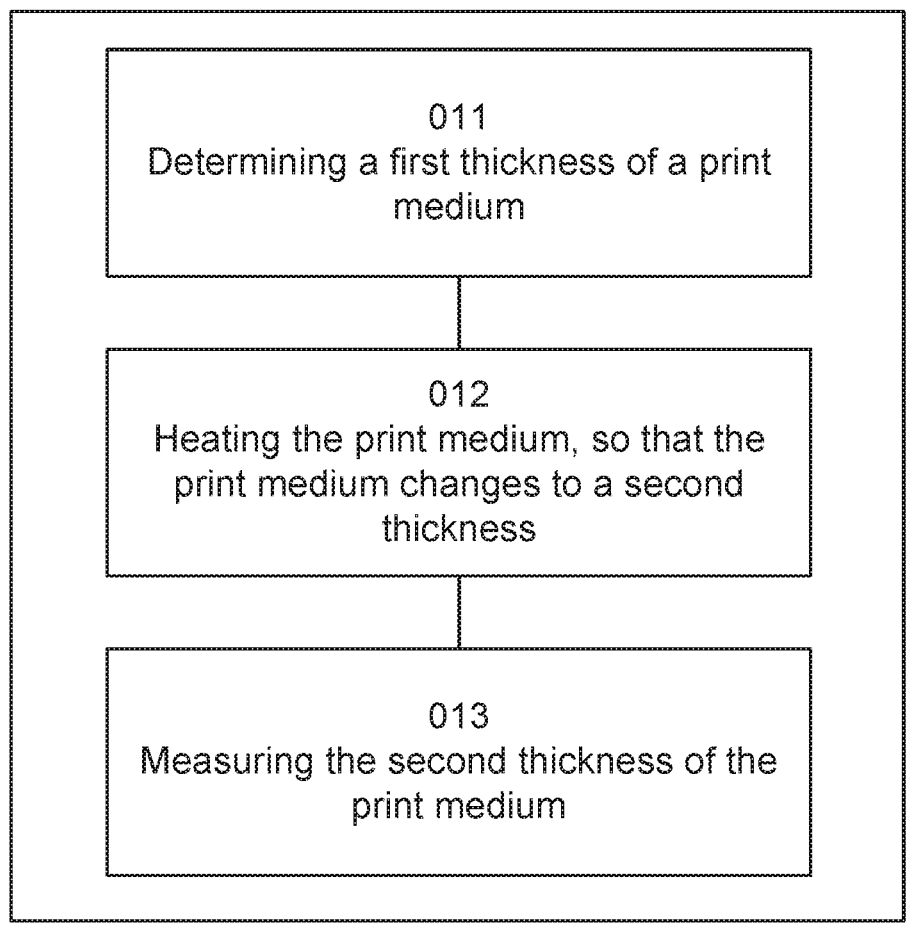
FIG. 1 shows a flow diagram of an example of a method to determine a change of a print medium.

In the following, the expression "print medium" comprises print media for use in 2D or 3D printing technology. A print medium may be flexible, rigid or in powder form. A flexible print medium may be provided in a rolled form, e.g. a roll of paper, plastic foil, cellulosic foil or aluminum foil. A rigid print medium may be stiff and not substantially bendable. For example, a rigid print medium is not roll- or foldable, but may be substantially flat, e.g. a plate, a board, a plank or a tray. In some examples, a rigid print medium may be a board of wood, plastic, carton, cotton, cellulosic foam, polyvinyl chloride foam, acrylic foam, polystyrene or other synthetic material. In 3D printing technology a print medium may be provided as a fused or non-fused layer of build material, e.g. plastic or metal powder.

In the following, the expression "print material" comprises print materials or build materials for use in 2D or 3D printing technology or printing agents, e.g. binding agents, coalescing agents, fusing agents, color agents etc., used in 2D or 3D printing technology. Print material may be a printing fluid, ink, toner, a liquid composition, a powder based material or grained material. For example print material comprises at least one of water, glycol, dyes, pigments, and further ingredients. In some examples print material includes latex or other binders.

Print material may be guided through a delivery structure, e.g. tubes, channels or ink delivery structure, to a print head. In some examples print material is pumped from a plurality of supply containers through a delivery structure to a print head.

A print head is to distribute, e.g. via an ejection mechanism through nozzles, print material onto a print medium. In some examples, an ejection mechanism is based on a piezoelectric effect or on a thermal resistor mechanism. For example, a print head nozzle may have a firing chamber in which a thermal resistor is to heat a printing fluid, so that an expanding fluid bubble is formed and fluid drops are ejected through the nozzle orifice. A print head may comprise a single print head, a plurality of print heads, a print head assembly, a writing system assembly or a writing engine. In some examples a print head comprises inner delivery structures, e.g. channels or a manifold, to guide the print material to a series of print head dies. In an example, a print head die comprises print material delivery structures, e.g. channels on a substrate or circuitry, and print material ejection circuitry to eject the print material from the nozzles mounted on the nozzle plate of the print head die. The print head die may be a silicon die.

A print head may be fixed at a support structure, including e.g. a carriage, a holder or a scan axis, wherein the support structure may be mounted over a print zone. The support structure may be movable over the print zone, e.g. to scan or move the print head over the print zone. The print head may be removable attached to the support structure. For example, the print head may be replaceable.

In some examples, the support structure is movable in a dimension over the print zone to scan the whole width or length of the print zone. A support structure may also be movable in two dimensions to scan the whole width and length of the print zone. A support structure may also span the whole width or length of a print zone and may be stationary, for example as implemented in a page-wide configuration. In a page-wide configuration a support structure may carry an array of print heads spanning over the whole width or length of a print zone or a support structure may carry a single print head with an array of nozzles spanning over the whole width or length of a print zone. A support structure may be movable to service stations or other stations outside of the print zone and there may exist a series of support structures carrying print heads and possibly other components.

A print medium may be provided to the print zone, so that a print head can eject print material onto the print medium. In some examples, the print medium is larger, in at least one dimension, than the print zone and the print medium is partially provided to the print zone. The print medium may advance through the print zone along a media path. The print medium may advance through the print zone, so that print material can be distributed via print head nozzles onto the print medium's surface. The print head may be movable over at least one dimension of the print medium's surface and the print material may be ejected through nozzles of the print head to distribute a specific pattern on the print medium.

In some examples, the print medium, or at least a part of the print medium, is heated. The print medium may be heated before print material is ejected onto the print medium, during print material ejection or afterwards. The print medium may be preheated to obtain a warm or hot print medium before the interaction of print material and print medium takes place. The print medium may be heated after ejection of print material thereon. For example, the print medium may be heated in order to dry the print material on the print medium, to cure or to melt the print material on the print medium, to bind the print material on the print medium or to harden the print material. In some examples, a print medium is heated after or during ejection of latex-based ink thereon, to dry the latex-based ink on the print medium.

The print medium, or at least a part of the print medium, may be heated in a heat zone. The heat zone may be a section along the media path. In some examples, there are more heat zones or heating processes, e.g. a zone for drying and a zone for curing. In some examples, heat dissipates from the heat zone to the print zone and both zones may have a warm or hot environment, e.g. a specific temperature condition. In some examples, ejecting print material and heating the print medium may be performed in the same section along the media path. In some examples the print zone and the heat zone may be overlapping.

Heating the print medium may change the print medium. The print medium may change its form and/or size, for example the print medium changes in thickness due to thermal dilatation or contraction. A change in size of the print medium may change the distance of the print head to the print medium in the print zone. A change in distance of the print head to the print medium may influence the printing quality, e.g. the alignment accuracy or the dot formation. For example a print system is aligned for a specific distance of the print head to the print media surface and a print system may be calibrated for a specific thickness of the print medium. For example in bidirectional printers, this means where a print head is scanning along a dimension over the print zone and ejects print material when scanning back and forth, a change in thickness of the print medium causes that ejected print material may not coincide in the same spot on the print medium when ejecting during opposite scanning directions. These dot placement errors may decrease the image quality of the printed image on the print medium.

A change, e.g. deformation, dilatation or contraction, of the print medium may depend on the material of the print medium, thermal coefficients of the print medium, the size of the print medium, e.g. the thickness, or the temperature of the print and/or heat zone. A solution to determine a change of the print medium, which is convenient and easy to implement to a print system, is desired. The present disclosure describes a method, a computer readable medium with instructions and a system to determine a change of a print medium, based on which the change in distance of the print medium to the print head may be derived. In some examples the change in size may be determined and corrective measure may be performed to improve the image quality, e.g. reduce dot placement errors.

FIG. 1 shows a flow diagram of an example of a method to determine a change of a print medium. The method may be implemented as instructions comprised in a computer readable storage medium to be executed by a processing system, such as the processing system (042) and storage medium (043) shown in FIG. 4. In an example of the method, at block (011) a first thickness of the print medium is determined, at block (012) the print medium is heated, so that the print medium changes to a second thickness, and at block (013) the second thickness of the print medium is measured.

The thickness of the print medium may be the dimension of the print medium extending perpendicular to the surface of the print medium on which is to be printed. In some examples, the thickness of the print medium is along a vertical axis, e.g. an axis along print material ejection direction through a print head nozzle. In some examples, the thickness of the print medium is the smallest dimension of the print medium. The thickness of the print medium may represent an average value of thicknesses at certain locations of the print medium's surface. For example, the thickness may be varying over different locations, the surface may not be smooth or may have irregularities, and the thickness is an averaged value over these variations.

In an example, a rigid print medium having a first thickness larger than 1 mm is provided. The rigid print medium may be provided in a substantially flat form, e.g. not as a roll of the print medium. The rigid medium may be provided so that the thickness is along a vertical axis and the surface of the rigid substantially flat print medium extends horizontally. The rigid print medium may have a prismatic form.

In some examples, to determine the first thickness of the print medium (011), the thickness of the print medium is measured. The first thickness of the print medium may be measured in the same way as the second thickness of the print medium may be measured.

The thickness of the print medium, first and/or second thickness, may be measured with a ruler or a sliding caliper, e.g. manually by a user. The thickness of the print medium may be measured with mechanical components, e.g. an alignment bar, a measurement bar, etc. The thickness of the print medium may be measured with a sensor, e.g. a height sensor, an optical sensor, an ultrasonic sensor, a contact sensor, a pressure sensor, an electrical sensor or a capacitance sensor. The thickness of the print medium may be measured in an automatized way. The thickness of the print medium may be determined at various locations and may represent an average value.

In some examples, the first thickness of the print medium is determined (011) by user interaction or with a processor. The first thickness of the print medium may be provided, e.g. printed, written or encoded, on the print medium, on the packing of the print medium or on an identifying object to provide the first thickness of the print medium. The provided thickness value of the print medium may be scanned and determined by a processor. The provided thickness value of the print medium may be determined by a user, e.g. a written thickness may be read by the user. In some examples the first thickness of the print medium may be obtained by a processor from a computer readable storage medium.

The print medium is heated in block (012), so that the print medium changes to a second thickness due to thermal deformation, expansion or contraction of the print medium. Temperatures of the ambient environment of the print medium when heated may be about seventy degrees Celsius, sixty degrees Celsius, fifty degrees Celsius, less than forty degrees Celsius or about eighty degrees Celsius. In some examples, due to thermal expansion, the print medium may change to a second thickness that is about ten percent larger than the first thickness. The print medium may change to a second thickness that is about one percent, two percent, three percent, four percent, five percent, about twenty percent or about thirty percent larger than the first thickness. In some examples, the print medium may change to a smaller second thickness than the first thickness.

In some examples, the print medium is heated to simulate print temperature conditions. No print material may be ejected onto the print medium when heating the print medium in those examples, and the temperature conditions during heating may resemble temperature conditions during printing. In some examples, the print medium is heated to pre- or post-process the print medium, e.g. to pre-heat the print medium, to bind, dry or cure print material on the print medium. In some examples, heating the print medium to simulate print temperature conditions is performed in the same manner as heating the print medium in the printing process.

In some examples, the print medium may be heated with a heat element. The print medium may be heated with a heat element, wherein the heat element is the same heat element as to heat the print medium during the printing process. For example, a diffusor may be to heat the print medium and the diffusor, when in use, may simulate print temperature conditions, so that the print medium changes to a second thickness. The diffusor is to blow air of a temperature range onto the print medium. A diffusor may include a heat unit comprising circuitry, e.g. a heat rod or a resistor, and an element, e.g. a fan, to blow heated air in a directed way, e.g. through a slit or along a path, onto the print medium. In some examples, the diffusor may be used to dry print material on the print medium.

In block (013) the second thickness of the print medium is measured. The second thickness of the print medium may be measured with methods described above. The second thickness of the print medium may be measured with the same method as the first thickness of the print medium is measured, if the first thickness is measured.

Figure 2:
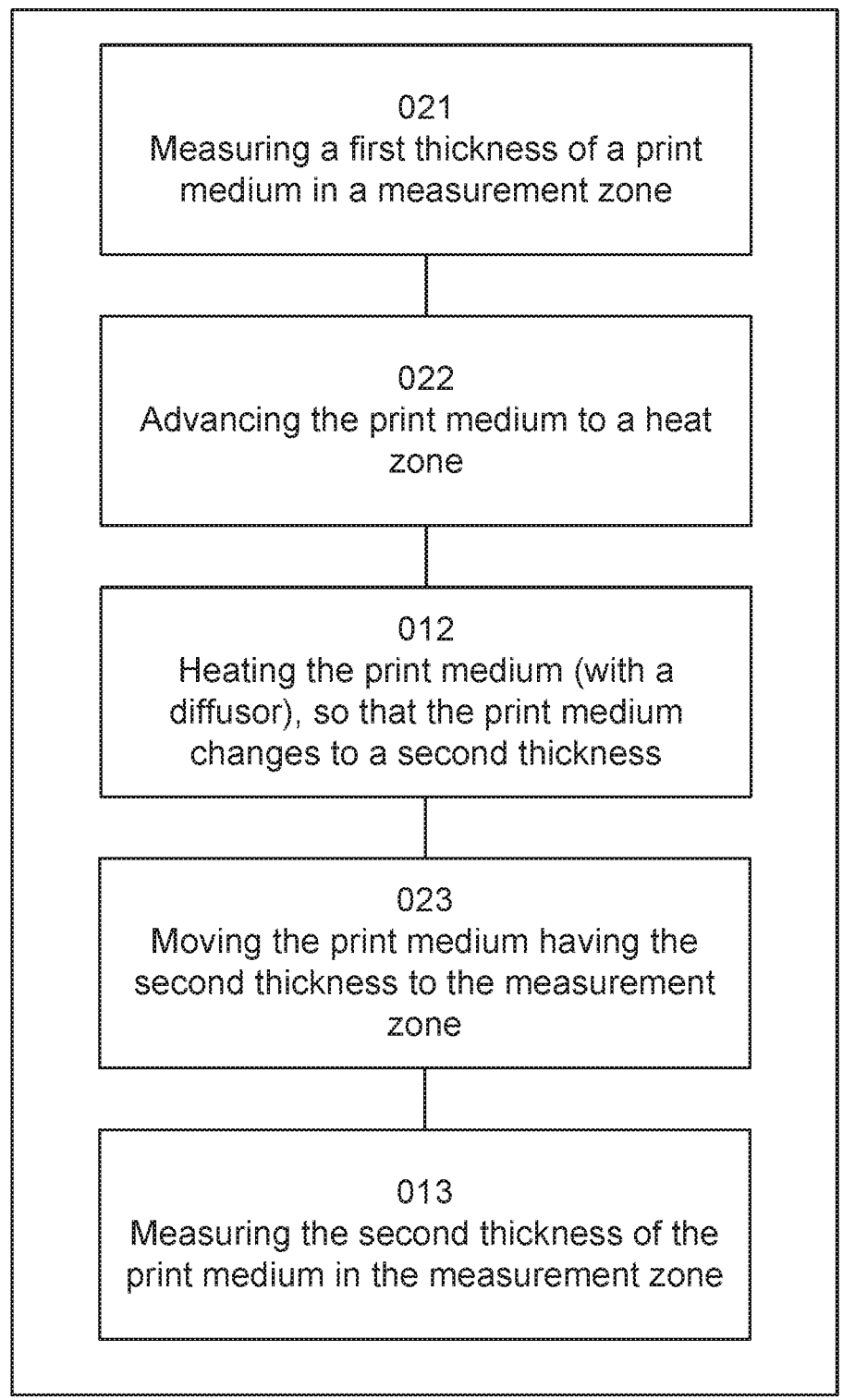
FIG. 2 shows a flow diagram of an example of a method to determine a change of a print medium.

FIG. 2 shows a flow diagram of another example of a method to determine a change of a print medium. The method may be implemented as instructions comprised in a computer readable storage medium to be executed by a processing system, such as the processing system (042) and storage medium (043) shown in FIG. 4. In an example of the method, at block (021) the first thickness of the print medium is measured in a measurement zone, at block (022) the print medium is advanced from the measurement zone to a heat zone, at block (012) the print medium is heated in the heat zone, so that the print medium changes to a second thickness, at block (023) the print medium having the second thickness is moved from the heat zone to the measurement zone and at block (013) the second thickness of the print medium is measured in the measurement zone. The measurement zone and the heat zone may be adjacent sections along the media path.

A media path may be a path along which the print medium is advanced through different sections or zones. Different sections of the media path may be a measurement zone, a print zone, a heat zone, a pre- and post-processing zone, etc. Different zones may be part of one print system and different zones may be overlapping partially or completely. A print system may perform print functions, e.g. ejecting print material to form a pattern on a print medium surface, such as printing, pre- and post-processing, etc. In some examples, ejecting print material and heating the print medium may be to be performed in the same zone along the media path, e.g. the heat and print zone. In some examples, the print zone and the heat zone may be overlapping and heat may dissipate from the heat zone to the print zone.

In some examples, a print medium may be moved along a media path by a media advance system, e.g. a belt or assembly, a slide, a guide system or a media delivery system. A media advance system to move a print medium between a measurement zone and a heat zone may be motorized. A media advance system may be to move a print medium back and forth between a measurement zone and a heat zone.

Figure 3:
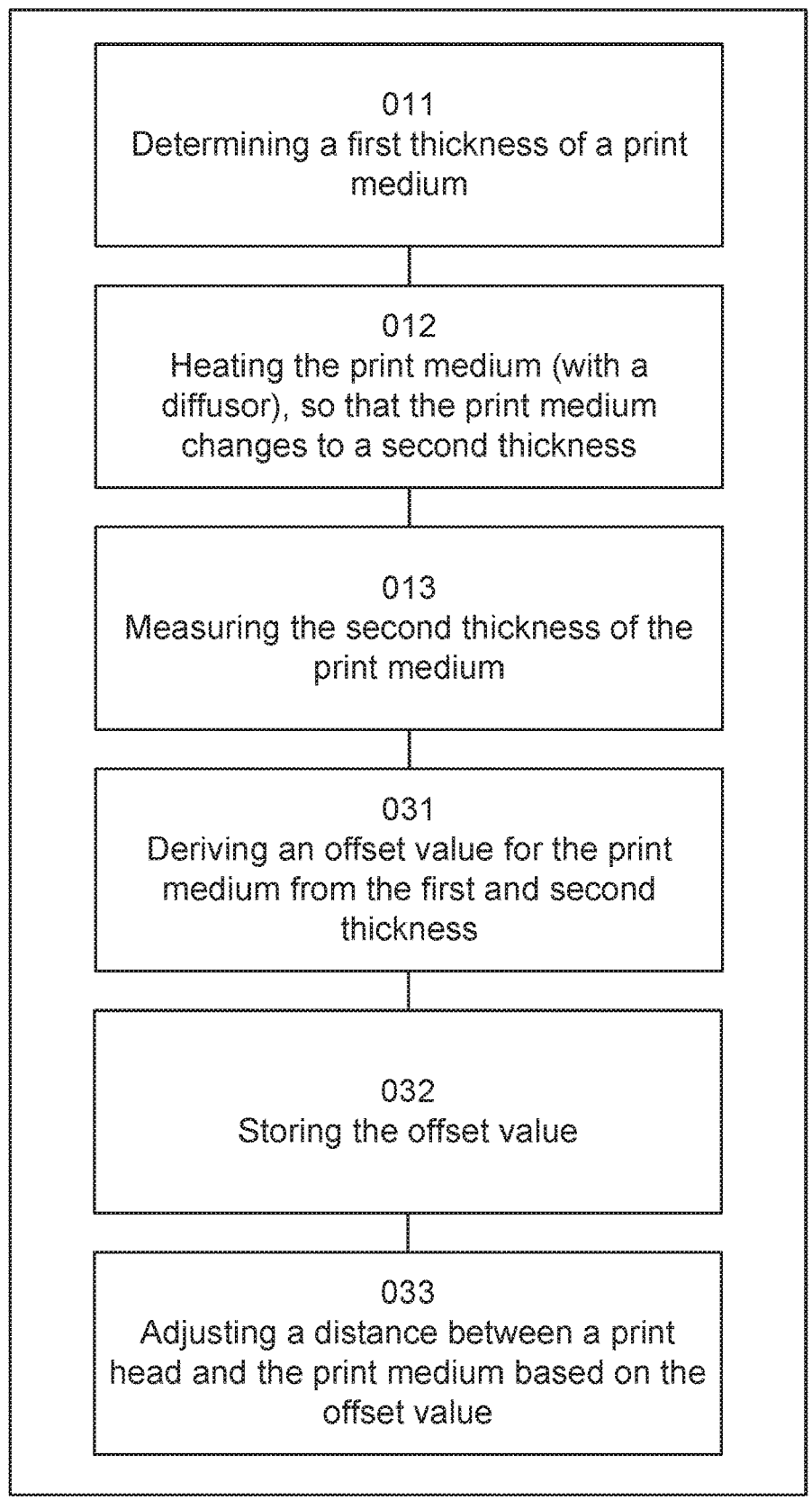
FIG. 3 shows a flow diagram of an example of a method to determine a change of a print medium.

FIG. 3 shows a flow diagram of another example of a method to determine a change of a print medium. The method may be implemented as instructions comprised in a computer readable storage medium to be executed by a processing system, such as the processing system (042) and storage medium (043) shown in FIG. 4. In an example of the method, at block (011) the first thickness of the print medium is determined, at block (012) the print medium is heated, so that the print medium changes to a second thickness, at block (013) the second thickness of the print medium is measured, at block (031) an offset value, based on the first and second thickness, of the print medium is derived, at block (032) the offset value is stored and at block (033) the distance between a print head and the print medium is adjusted based on the offset value.

In that example, the offset value of the print medium is derived from the first and second thickness of the print medium (031). For example, the offset value may be derived from the difference of the first and second thickness. The offset value may be an absolute value or a relative value. The offset value may be represented in units of meter, centimeter, millimeter, or as percentage or decimal.

The offset value may be stored (032). For example the offset value may be stored on a computer readable medium, e.g. on a storage medium (043) shown in FIG. 4. The offset value may be stored in a parameter file for the print medium type of the print medium, e.g. print medium parameters (062) stored on a storage medium (043) shown in FIG. 6. Different print medium parameter files may contain information about specific print medium types, e.g. information about the offset value, information about the offset value at different print temperature conditions, material of print medium, first thickness of print medium, size of print medium, color etc. Print medium types may be categories or classes based on at least one of print medium material, first thickness, provider, or other properties, e.g. color.

Based on the offset value, a distance between the print head and the print medium may be adjusted (033). The distance between the print head and the print medium may be changed, based on the offset value, to a distance for which the print system is calibrated, e.g. a distance where no dot placement errors occur. The distance may be adjusted, based on the offset value, by moving the print medium, by moving the print head or by moving both, e.g. a relative distance may be adjusted based on the offset value. For example, the distance may be adjusted by moving the print head about the offset value. In some examples, the distance between the print head and the print medium may be adjusted, based on the offset value, by moving manually or automatically a support structure carrying the print head. The print head may be movable along the same axis as the thickness of the print medium extends, e.g. perpendicular to the print medium surface on which can be printed.

Figure 4:
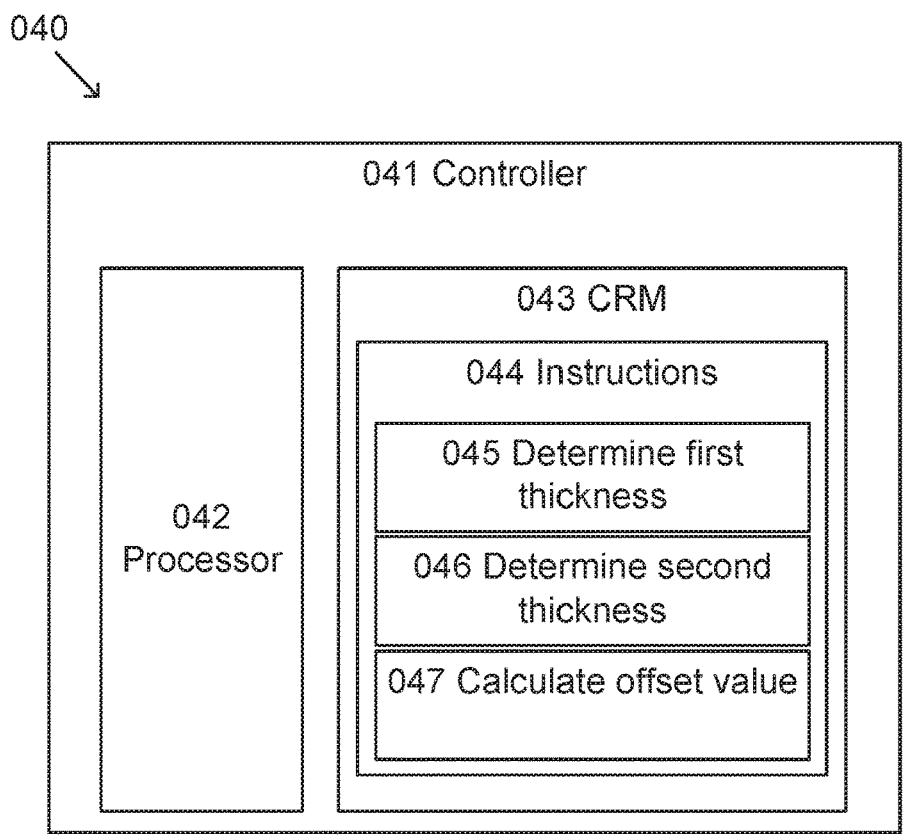
FIG. 4 schematically shows an example of a computer readable storage medium comprising instructions to determine a change of a print medium, the instructions executable by a processor.

FIG. 4 schematically shows an example of a controller (041) to determine a change of a print medium. A controller (041) comprises a processing system (042), e.g. CPU or GPU, and a computer readable storage medium (043) comprising instructions (044). The computer readable storage medium (043) may comprise volatile, e.g. RAM, and non-volatile components, e.g. ROM, hard disk, CD-ROM, flash memory, etc. The instructions (044) comprise instructions executable by the processing system (042) and the instructions (044) may implement a method to determine a change of a print medium.

The controller (041) may be comprised in the control system of a print system, wherein the control system of the print system is a controller to control print functions, e.g. printing, calibration processes, post-processing, print head movement, curing devices, print head functions, etc. The controller (041) may be comprised in a distributed network system or may be a microcontroller. In an example, the instructions (044) are a firmware update and the storage medium (043) may be a CD-ROM, a flash drive or a storage on a server. The instructions (044) on the CD-ROM or flash drive may be executable by the processing system (042) of a print system.

In an example, a non-transitory computer readable storage medium (043) comprises instructions (044), that when executed by the processing system (042), cause the processing system (042) to determine a first thickness of a print medium before heating (045), to determine a second thickness of the print medium after heating (046) and to calculate an offset value, based on the first and second thickness, to calibrate a print head to print medium distance (047).

In some examples, the processing system (042) may receive the first and/or second thickness of the print medium from user input through an interface. An interface may be a user-interface comprising circuitry to receive user input and communicate user input to the processing system (042) and/or circuitry to send information from a processing system (042) to an output, e.g. to show information on a screen or a display to a user. In some examples, the processing system (042) may receive the first and/or second thickness of the print medium from a sensor to measure the thickness of the print medium or from a computer readable storage medium, e.g. the storage medium (043) in FIG. 4, storing the thickness value. In some examples, the instructions (044) include instructions to control a sensor to measure the first and/or second thickness of the print medium. The controller (041) may comprise electronics for communicating with a sensor and for controlling components, e.g. an alignment bar, a ruler or a measurement bar, to measure a first and/or second thickness of the print medium.

The processing system (042) may calculate an offset value based on the first and second thickness. The offset value may be to calibrate a print head to print medium distance. For example, the offset value may be derived from the difference of the first and second thickness. The offset value may be an absolute value or a relative value. The offset value may be represented in units of meter, centimeter, millimeter, or as percentage or decimal.

The processing system (042) may use the offset value to calibrate a print head to print medium distance. For example, the distance between the print head and the print medium is aligned for a distance where no dot placement errors occur on the surface of the print medium. The offset value may be used to calculate an alignment, e.g. positions of print head and/or print medium, where no dot placement errors occur.

In some examples, the processing system (042) may control the position of a print head to adjust the print head to print medium distance based on the offset value. For example, the processing system (042) may control a motor to move an amount of steps in order to move the print head, e.g. attached at a motorized support structure, by the offset value or to a position, so that the print head to print medium distance is aligned.

Figure 6:
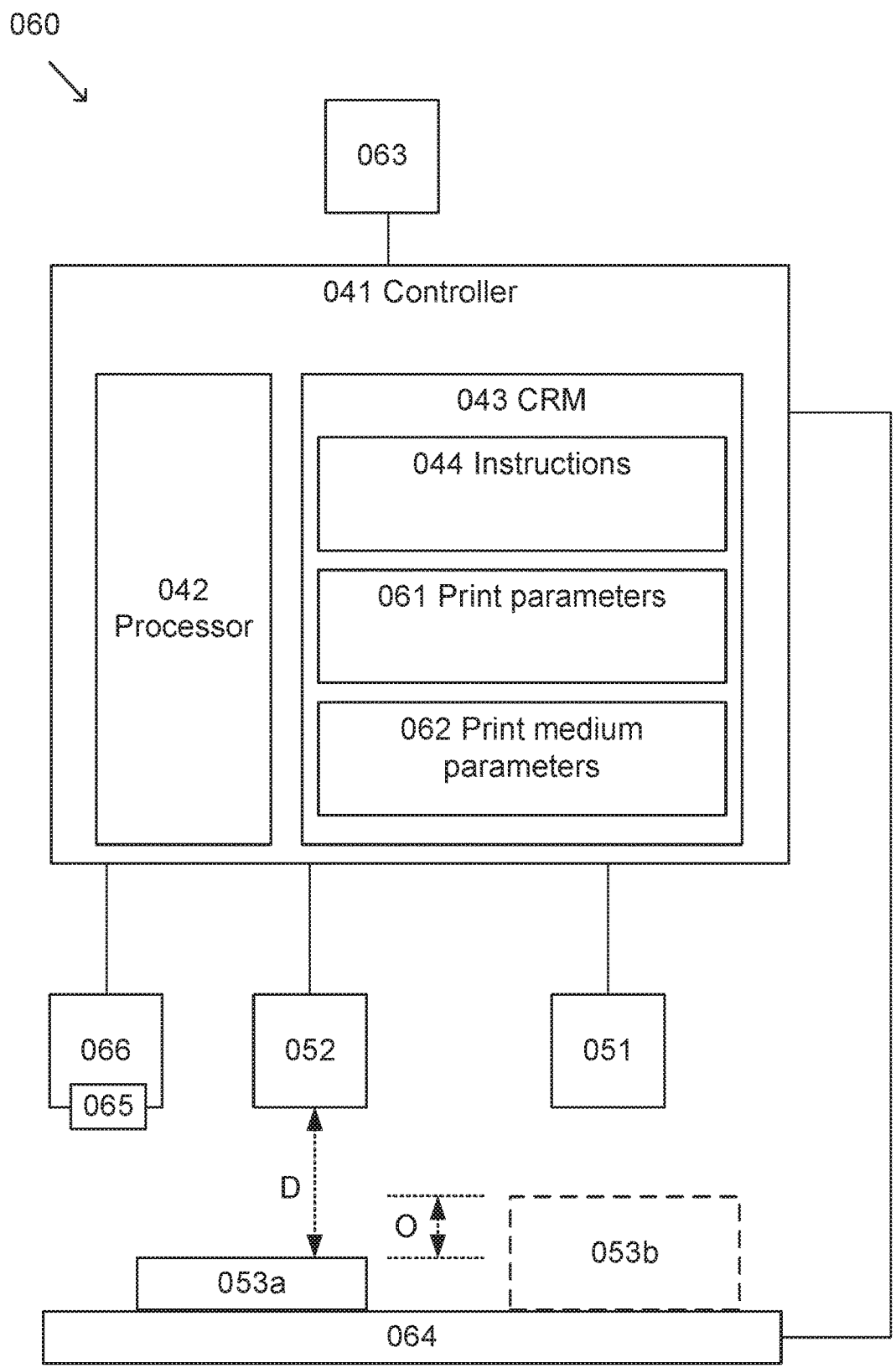
FIG. 6 schematically shows an example of a system to determine a change of a print medium.

In some examples, the processing system (042) may store the offset value in a parameter file for the print medium type of the print medium. For example, print medium parameters (062), shown in FIG. 6, are comprised in a computer readable storage medium (043). Print medium parameters (062) may be stored in a database, e.g. in a database on a server or on the storage medium of the print system, and the database may be accessible by the processing system (042). The offset value is stored in a print medium parameter file (062) characterized by the type of the print medium, e.g. depending on at least one of the print medium material, first thickness, color, properties, etc.

The offset value may be restored and used when another print medium of the same type is to be provided. A user may communicate through an interface with the is controller (041) to select a print medium type, based on which the offset value is to be used. The stored offset value of the print medium type may be used to adjust the distance of a print head to the other print medium provided.

In some examples, print parameters (061) may be stored on a storage medium (043) as shown in FIG. 6. Print parameters (061) may include print temperature conditions, e.g. print temperature for different print modes, temperature of heat element or of a heat zone, and other print parameters, e.g. carriage speed, color management, drying settings, print media advance, etc. In some examples, processor (042) uses print parameters (061) to simulate print temperature conditions. For example, based on print parameters (061) processor (042) executes instructions (044) to control a heat element, e.g. a diffusor, to heat a print medium in order to simulate print temperature conditions.

Figure 5:
FIG. 5 schematically shows an example of a system to determine a change of a print medium.

FIG. 5 shows an example of a system to determine a change of a print medium. The system (050) includes a heat element (051) to warm a print medium, so that the print medium having a first thickness (053a) changes to a second thickness (053b), a controller (041) to determine the first thickness of the print medium (053a) before heating and the second thickness of the print medium (053b) after heating, and a print head (052), wherein the print head is movable relative to the print medium (053a and 053b) to adjust the print head to print medium distance (D).

A heat element (051) are means to heat the print medium (053a and 053b). The heat element (051) may heat the print medium (053a and 053b) uniformly, the heat element (051) may heat a heat zone, the heat element (051) may heat the print medium (053a and 053b) partially, the heat zone may be adjacent to a print zone and heat may dissipate to the print zone. The print medium having a first thickness (053a) may change to a print medium having a second thickness (053b) when heated with the heat element (051). In some examples, a heat element (051) is a diffusor comprising a resistor or heat unit and a fan to blow hot air onto the print medium (053a and 053b).

A print head (052) may be attached, e.g. removably attached, to a support structure. The support structure may be a carriage, a lift axis, a scan axis or a structure to hold the print head (052). The support structure may be movable to adjust a distance is between the print head (052) and the surface of the print medium (053a and 053b) based on the offset value (O), wherein the controller (041) may calculate the offset value (O) from the first and second thickness. The print head (052) may be movable along a vertical axis, e.g. perpendicular to the print medium surface.

FIG. 6 shows another example of a system to determine a change of a print medium. In some examples, the controller (041) comprises electronics for communicating and controlling components of the system (060) to determine a change of a print medium.

For example, the controller (041) may control the print head (052) or a movable support structure to adjust the distance of the print head (052) to the print medium (053a and 053b) based on the offset value (O). A support structure may have lifters in order to manually, automatized and/or motorized vary the position of the print head (052). In some examples, another support structure, e.g. a platform or a belt, supporting the print medium (053a and 053b) may be movable to vary the distance of the print medium (053a and 053b) to the print head (052). The relative distance of the print head (052) to the print medium (053a and 053b) may be varied for example with a step motor, a spindle drive, a wire drive or a pump mechanism.

In some examples, the controller (041) may control a heat element (051) to heat the print medium (053a and 053b), so that the print medium (053a and 053b) changes to a second thickness. The controller (041) may for example control a diffusor to heat the print medium (053a and 053b) and may use print parameters (061) to simulate print temperature conditions.

In some examples, the controller (041) may control a sensor to determine the first and second thickness of the print medium (053a and 053b). The controller (041) may control a movable measurement bar (066) with a contact sensor (065) to measure the first and second thickness of the print medium (053a and 053b). The measurement bar (066) may be to move down when the print medium (053a and 053b) is in a measurement zone or a measurement position and the sensor (065) may send a signal when the sensor (065) and/or measurement bar (066) is in contact with the print medium (053a and 053b). The controller (041) may obtain position information of the measurement bar (066) when the contact sensor (065) is in contact with the print medium (053a and 053b) surface. The controller (041) may determine from the obtained information a thickness of the print medium (053a and 053b). A measurement bar (066) may be an alignment bar, wherein the alignment bar may be to align a print medium in horizontal directions or to align the print medium's position in a section of the print media path.

In some examples, system (060) comprises an interface (063) to communicate parameters, e.g. print parameters (061), print medium parameters (062), between the controller (041) and a user. For example, the interface (063) may be used to communicate the first and second thickness, the print medium type, etc.

In some examples, system (060) comprises a media advance system (064) to move the print medium (053a and 053b) and the controller (041) may control the media advance system (064) to move the print medium (053a and 053b) between a measurement zone and a heat zone. The advance system (064) may be a movable belt, a movable platform, a slide or a movable support structure to advance the print medium (053a and 053b) along a media path, wherein a measurement zone and a heat zone may be part of the media path. The print medium (053a and 053b) may advance via the advance system (064) in a perpendicular direction to the thickness of the print medium (053a and 053b). The advance system (064) may be to move a print medium (053a and 053b) back and forth along the print media path, e.g. to move the print medium (053a and 053b) between a heat zone and a measurement zone back and forth.

FIGS. 7a-7h schematically show example processes of a system to determine a change of a print medium and the advancement of the print medium along a media path, including a measurement zone (071) and a heat zone (072). The measurement zone (071) may be a zone along the media path where the print medium thickness is to be measured and the heat zone (072) may be a zone along the media path where the print medium is to be heated. Both zones may be part of a print system.

Figure 7A:
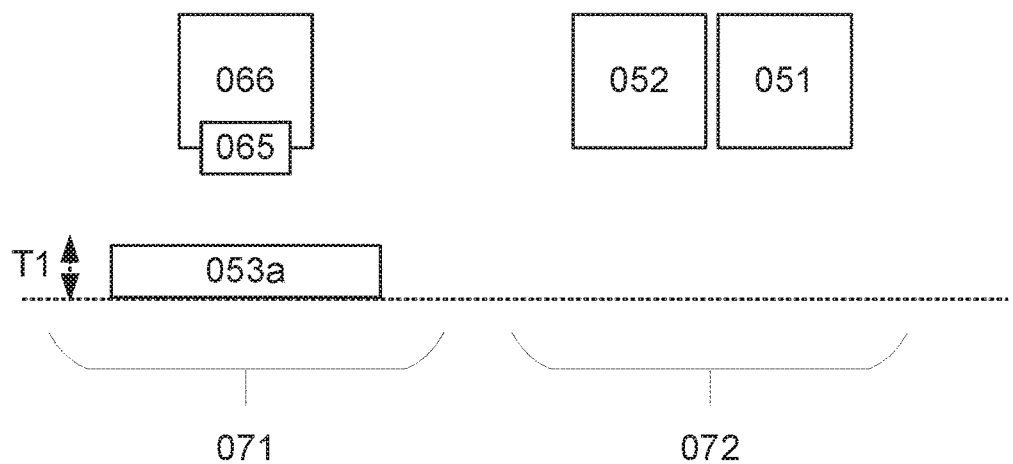
FIGS. 7a-7h schematically show example processes of a system to determine a change of a print medium.

FIG. 7a schematically shows the print medium (053a) having a first thickness in the measurement zone (071). In an example of the method to determine a change of a print medium, the first thickness (T1) of the print medium (053a) is measured in the measurement zone (071) by a measurement bar (066) with a contact sensor (065).

Figure 7B:
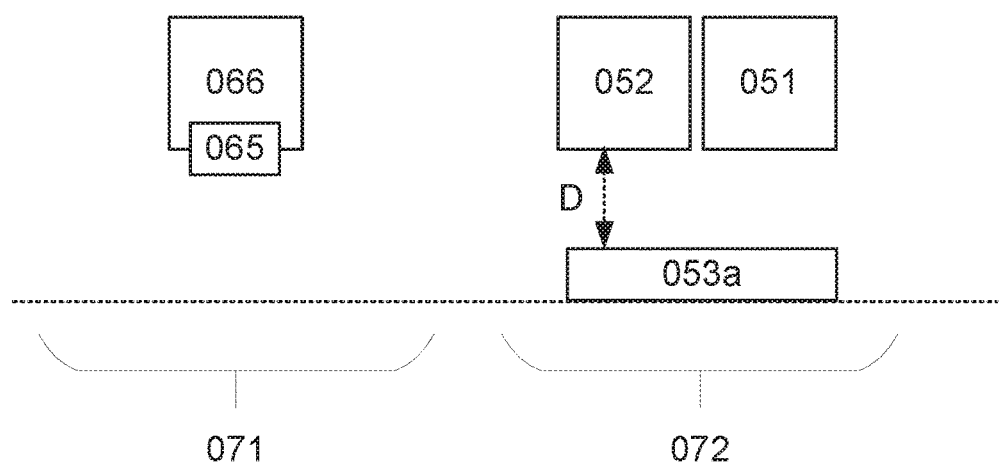

FIG. 7b schematically shows the print medium (053a) having a first thickness advanced to the heat zone (072). FIG. 7b shows the print head (052) to print medium (053a) distance (D), which may be a calibrated distance. The print medium (053a) may be advanced to the heat zone (072) via an advance system, e.g. as shown in FIG. 6.

Figure 7C:
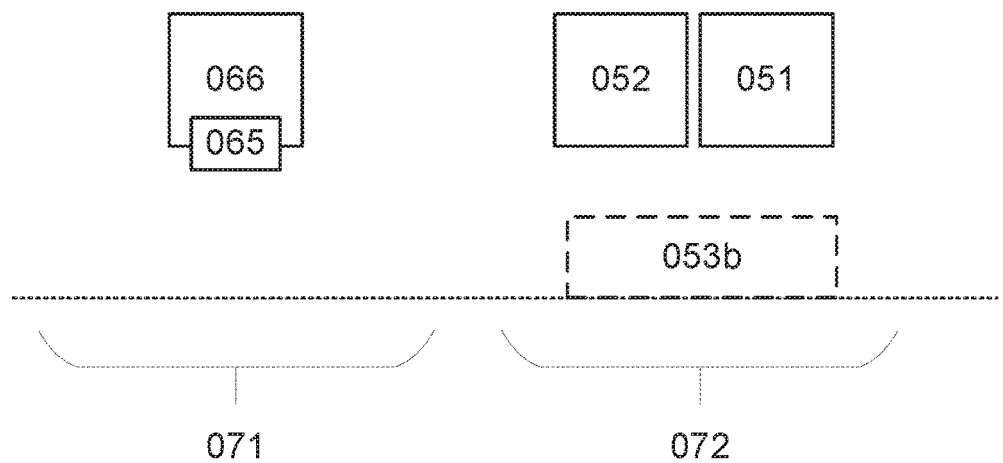

FIG. 7c schematically shows the print medium (053b) after heating with a heat element (051) in the heat zone (072), so that the print medium (053b) changed to a second thickness. In an example of the method to determine a change of a print medium, the heat element (051) is a diffusor to blow hot air of a temperature range onto the print medium.

Figure 7D:
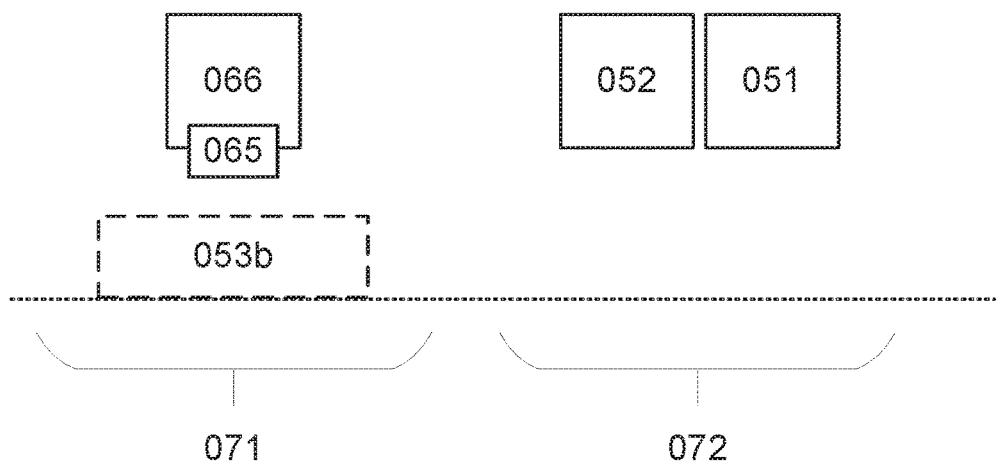

FIG. 7d schematically shows the print medium (053b) having the second thickness moved back to the measurement zone (071). The print medium (053b) may be moved to the measurement zone (071) via an advance system, e.g. as shown in FIG. 6.

Figure 7E:
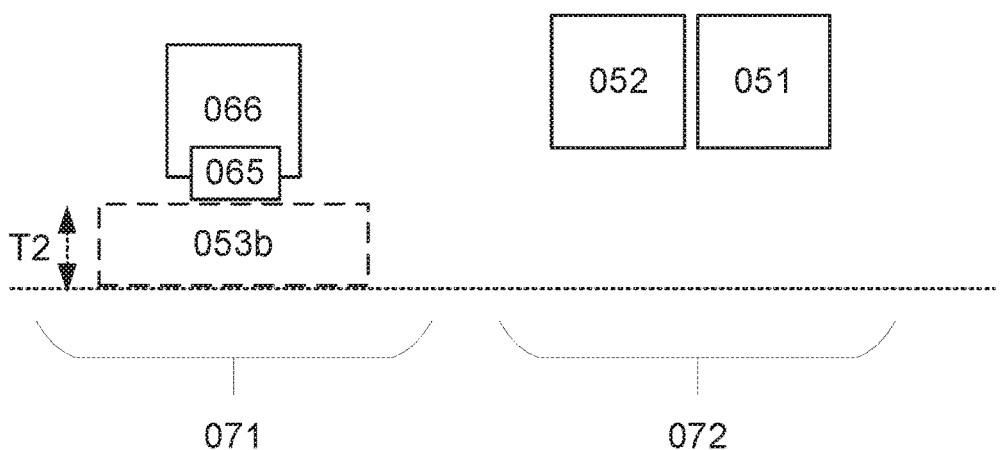

FIG. 7e schematically shows the measurement bar (066) moved down, so that the contact sensor (065) is in contact with the surface of the print medium (053b). In an example of the method to determine a change of a print medium, a sensor (065) may measure the second thickness (T2) of the print medium (053b). The position of the measurement bar (066) may be received by a controller to determine the second thickness (T2), e.g. a controller (041) as shown in FIG. 4.

Figure 7F:
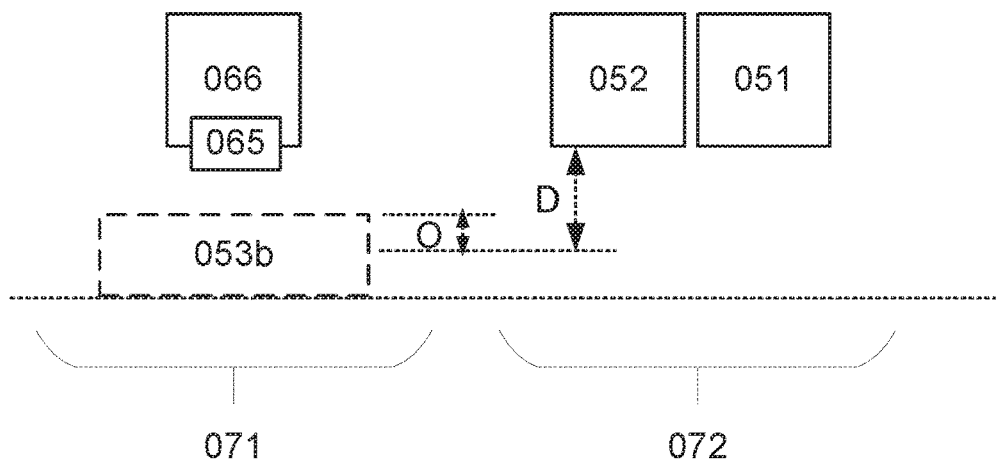

FIG. 7f schematically shows an offset value (O) based on the first (T1) and second (T2) thickness of the print medium (053a and 053b). In some examples, the offset value (O) may be the difference between the first (T1) and second (T2) thickness.

FIG. 7f schematically shows the calibrated distance (D), e.g. a distance (D) between the print head (052) and the print medium (053a) where no dot placement errors occur. In some examples, the measurement bar (066) may move up to not be in contact with the print medium (053b).

Figure 7G:
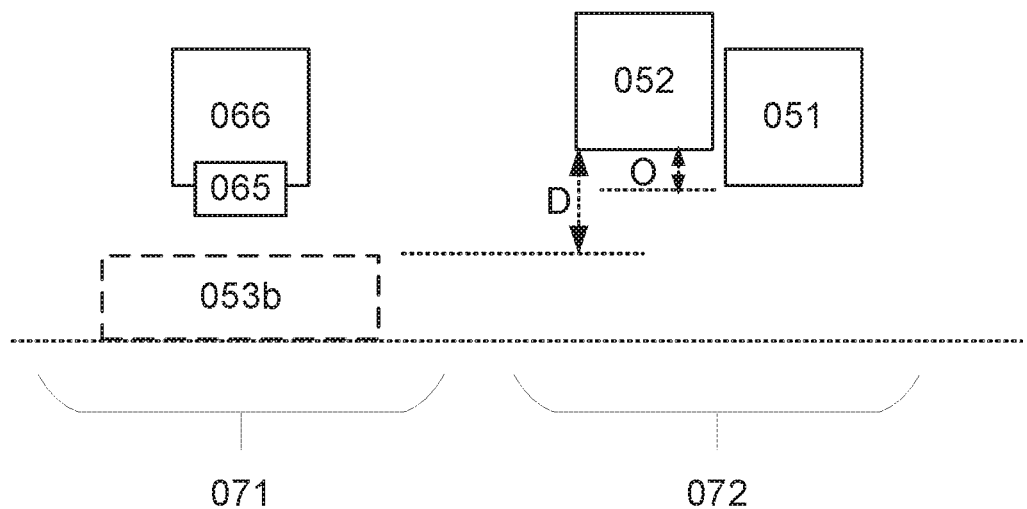

FIG. 7g schematically shows an adjustment of the position of the print head (052). In some examples, a distance between the print head (052) and the print medium (053b) may be adjusted based on the offset value (O) by moving the print head (052), e.g. by moving the print head (052) up a distance of the offset value (O).

Figure 7H:
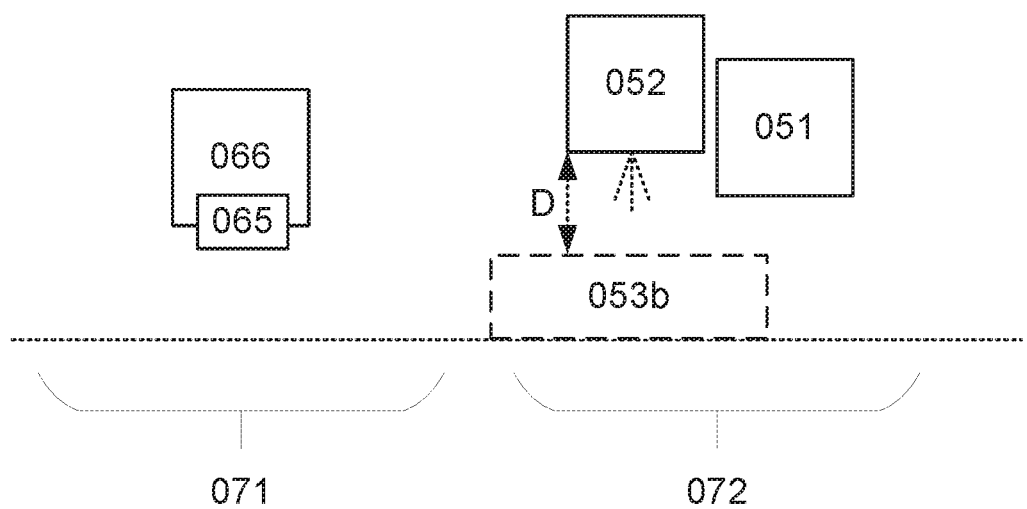

FIG. 7h schematically shows advancement of the print medium (053b) to the heat zone (072). In an example of the method to determine a change of a print medium, a heat zone (072) may overlap with a print zone. In some examples, the print head (052) may eject print material onto the print medium (053b), e.g. after the distance (D) between print head (052) and print medium (053b) was adjusted. In some examples, the heat element (051) may heat the print medium (053b) while or after print material is ejected onto the print medium (053b) by the print head (052).

The following terminology is understood to mean the following when recited by the description or the claims. The word "comprising" does not exclude the presence of elements other than those listed, the expressions "including", "part of" or "having" does not exclude the presence of elements other than those listed, "a", "an" or "the" does not exclude a plurality and a "series" or "plurality" does not exclude a singularity. The words "or" and "and" have the combined meaning "and/or" except combinations of listed features where at least some of such features and elements are mutually exclusive within the context.

All of the features disclosed in the claims and description (including drawings), and all of the elements of any method or process so disclosed, may be combined in any combination and order, except combinations where at least some of such features and/or elements are mutually exclusive.

The invention claimed is:

1. A method to determine a change of a print medium comprising:
   determining a first thickness of the print medium;

heating the print medium, so that the print medium changes to a second thickness; and measuring the second thickness of the print medium.

2. The method of claim 1, further comprising:

measuring the first thickness of the print medium in a measurement zone;

advancing the print medium to a heat zone in order to heat the print medium in the heat zone; and moving the print medium having the second thickness to the measurement zone in order to measure the second thickness of the print medium in the measurement zone;

wherein the measurement zone and the heat zone are adjacent sections along the media path.

3. The method of claim 1, further comprising:

deriving an offset value for the print medium from the first and second thickness; and storing the offset value.

4. The method of claim 3, further comprising:

adjusting a distance between a print head and the print medium based on the offset value.

5. The method of claim 4, further comprising moving the print head further away from the print medium based on the offset value, the offset value measuring expansion of the print medium caused by the heating.

6. The method of claim 1, comprising:

providing a rigid print medium having a first thickness larger than 1 mm, wherein the rigid print medium is provided in a substantially flat form.

7. The method of claim 1, comprising:

heating the print medium with a diffusor to simulate print temperature conditions, so that the print medium changes to a second thickness, wherein the diffusor is to blow heated air onto the print medium; and dry printing on the print medium with the same diffusor.

8. The method of claim 1, further comprising heating the print medium to cause expansion such that the second thickness is greater than the first thickness.

9. The method of claim 1, wherein determining the first thickness and measuring the second thickness each comprise measuring thickness at multiple locations on the print medium and producing an average thickness.

10. A non-transitory computer readable storage medium comprising instructions that, when executed by a processor, cause the processor to:

determine a first thickness of a print medium before heating;

determine a second thickness of the print medium after heating; and calculate an offset value based on the first and second thickness to calibrate a print head to print medium distance.

11. The medium of claim 10, further comprising instructions that, when executed by a processor, cause the processor to:

control a media advance system to move the print medium between a measurement zone and a heat zone;

control a heat element to heat the print medium in the heat zone, so that the print medium changes to the second thickness; and control a sensor to determine the first and second thickness of the print medium measured in the measurement zone.

12. The medium of claim 10, further comprising instructions that, when executed by a processor, cause the processor to:

store the offset value in a parameter file for the print medium type of the print medium, wherein the stored offset value is to be used when providing another print medium of the same print medium type.

13. The medium of claim 10, further comprising instructions that, when executed by a processor, cause the processor to:

control the position of the print head to adjust the print head to print medium distance based on the offset value.

14. The medium of claim 10, further comprising instructions that, when executed by a processor, cause the processor to:

use print parameters to simulate print temperature conditions when heating the print medium, so that the print medium changes to the second thickness.

15. A system comprising:

a heat element to warm a print medium, so that the print medium having a first thickness changes to a second thickness;

a controller to determine the first thickness of the print medium before heating and the second thickness of the print medium after heating; and a print head, wherein the print head is movable relative to the print medium to adjust the print head to print medium distance.

16. The system of claim 15, further comprising:

a movable support structure carrying the print head to adjust the distance between the print head and the print medium based on an offset value, wherein the controller is to calculate the offset value from the first and second thickness of the print medium.

17. The system of claim 15, comprising:

an interface to communicate parameters of the print medium between the controller and a user.

18. The system of claim 15, comprising:

a movable measurement bar with a contact sensor to measure the first and the second thickness of the print medium, wherein the measurement bar is to move down when the print medium is in the measurement zone, and wherein the controller obtains position information of the measurement bar when the contact sensor is in contact with the print medium.

19. The system of claim 15, wherein the heat element comprising a diffusor to blow heated air on the print medium, the diffusor arranged to both heat the print medium to cause the print medium to expand from the first thickness to the second thickness and to dry print material on the print medium after printing by the print head.

20. The system of claim 15, further comprising a media advance system to move the print medium between a measurement zone operated by the controller, where a sensor measures medium thickness, and a heat zone at the heat element.

* * * * *